US012710162B2

(12) United States Patent
Lam

(10) Patent No.: US 12,710,162 B2
(45) Date of Patent: Aug. 18, 2026

(54) SIMPLE LIGHT STRING

(71) Applicant: Season Bright (Cambodia) Electronic Lighting Co., Ltd., Bavet (KH)

(72) Inventor: Su Io Lam, Bavet (KH)

(73) Assignee: Season Bright (Cambodia) Electronic Lighting Co., Ltd., Bavet (KH)

( * ) Notice: Subject to any disclaimer, the term of this patent is extended or adjusted under 35 U.S.C. 154(b) by 0 days.

(21) Appl. No.: 18/962,424

(22) Filed: Nov. 27, 2024

(65) Prior Publication Data

US 2026/0117956 A1 Apr. 30, 2026

(30) Foreign Application Priority Data

Oct. 29, 2024 (CN) ......................... 202411522336.4

(51) Int. Cl.

| | |
|---|---|
| ***F21V 17/18*** | (2006.01) |
| ***F21S 4/10*** | (2016.01) |
| ***F21V 19/00*** | (2006.01) |
| ***F21V 19/04*** | (2006.01) |
| ***F21V 23/02*** | (2006.01) |
| ***F21Y 103/10*** | (2016.01) |

(52) U.S. Cl.

CPC ................ *F21V 17/18* (2013.01); *F21S 4/10* (2016.01); *F21V 19/0005* (2013.01); *F21V 19/04* (2013.01); *F21V 23/02* (2013.01); *F21Y 2103/10* (2016.08)

(58) Field of Classification Search

CPC ............................... F21S 4/10; F21V 19/0005

See application file for complete search history.

(56) References Cited

U.S. PATENT DOCUMENTS

| | | | | |
|---|---|---|---|---|
| 6,319,056 B1 * | 11/2001 | Schunk | H01R 33/46 | 439/505 |
| 12,345,382 B1 * | 7/2025 | Liang | F21V 3/061 | |
| 2005/0122723 A1 * | 6/2005 | Frederick | F21S 4/10 | 362/302 |
| 2009/0010000 A1 * | 1/2009 | Huang | H01R 13/7033 | 362/249.01 |
| 2009/0046481 A1 * | 2/2009 | Li | H01R 13/64 | 362/653 |

(Continued)

FOREIGN PATENT DOCUMENTS

CA 2623604 A1 * 8/2009 .......... F21V 19/0005

*Primary Examiner* — William N Harris

(74) *Attorney, Agent, or Firm* — Hayes Soloway PC

(57) ABSTRACT

A simple light string includes: a first lamp holder, a second lamp holder, and a wire. The first lamp holder and the second lamp holder are connected in series on the wire. The first lamp holder includes a light-emitting component, a housing, and a protective device. The second lamp holder includes a light-emitting component and a housing. The light-emitting components are each provided with a lampshade and a light-emitting device, and the light-emitting device of the first lamp holder and the protective device are connected in series. The housings each include a connection block and a base, and the light-emitting device and the protective device are fixed on the connection block through the lampshade. The connection block is movably provided with a buckle, and the base is provided with a fixation block that matches with the buckle. The base is electrically connected to the wire.

7 Claims, 5 Drawing Sheets

(56) References Cited

U.S. PATENT DOCUMENTS

| | | | | |
|---|---|---|---|---|
| 2009/0146167 | A1* | 6/2009 | Allen | F21V 31/04<br>257/E33.056 |
| 2009/0317996 | A1* | 12/2009 | Dianging | H01R 33/06<br>439/188 |
| 2015/0131279 | A1* | 5/2015 | Motoike | F21V 23/02<br>362/249.02 |

* cited by examiner

SIMPLE LIGHT STRING

CROSS-REFERENCE TO RELATED APPLICATION

This application is based on and claims the benefit of priority from Chinese Patent Application No. 202411522336.4, filed on Oct. 29, 2024, the entirety of which is incorporated by reference herein.

TECHNICAL FIELD

The present disclosure relates to the technical field of illumination, in particular, to a simple light string.

BACKGROUND

A light string includes a plurality of lamp holders connected in parallel or in series. In order to prevent short circuit in the light string caused by damage of the lamp holders, it is needed to arrange a protective device in the light string. In the related art, it is needed to arrange a plastic housing specifically used for placing the protective device in the housing. This makes it challenging to control the size of the entire lamp holder, significantly increases the production cost of the light string, and causes inconvenience for daily use.

SUMMARY

In order to solve the above problems, an objective of the present disclosure is to provide a simple light string to ensure the protective performance of the lamp holder and reduce the production cost of the light string.

The technical solution adopted by the present disclosure to solve the problem is as follows:

A simple light string, including: a first lamp holder, a second lamp holder, and a wire, where the first lamp holder and the second lamp holder are connected in series on the wire; the first lamp holder includes a light-emitting component, a housing, and a protective device; the second lamp holder includes a light-emitting component and a housing; each of the light-emitting components of the first lamp holder and the second lamp holder is provided with a lampshade and a light-emitting device, and the light-emitting device of the first lamp holder is connected in series with the protective device; each of the housings of the first lamp holder and the second lamp holder includes a connection block and a base, and the light-emitting device and the protective device are fixed on the connection block through the lampshade; the connection block is movably provided with a buckle, and the base is provided with a fixation block that matches with the buckle; and the base is electrically connected to the wire.

The above-mentioned simple light string has at least the following beneficial effects. By arranging the first lamp holder and the second lamp holder, the stability of the simple light string can be ensured through the light-emitting components and the housings, the number of the protective device can be reduced while ensuring the protective performance of the simple light string, the production cost of the light string can be reduced, the safety of the simple light string can be improved, and the service life of the simple light string can be prolonged. By arranging the connection block and the base, the first lamp holder and the second lamp holder can be quickly and stably mounted on the wire to prevent the light-emitting components and the protective device from loosening during installation and use, thereby improving the production efficiency and the structural stability of the simple light string.

Further, the buckle is provided with a positioning hole that matches with the fixation block. By forming the positioning hole, it is convenient to fix the buckle on the base quickly and stably to improve the assembly convenience and structural stability of the housing.

Further, the buckle and the connection block are integrally formed. This structure ensures the integration of the buckle and the connection block, prevents the buckle from loosening during use, and improves the structural stability of the simple light string.

Further, a height of the fixation block gradually decreases in a direction approaching the base. This structure ensures that the fixation block can be quickly and stably fixed in the positioning hole, and also prevents the connecting stability of the connection block and the base from being affected as the buckle falls off during use.

Further, the second lamp holder is provided in plural, and the first lamp holder is located between the plurality of second lamp holders. This structure reduces the number of the protective device, decreases the production cost of the light string, improves the safety of the simple light string, and prolongs the service life of the simple light string.

Further, a ratio of a number of the second lamp holders to a number of the first lamp holder is greater than or equal to 3. This structure effectively reduces the number of the protective devices while ensuring the protective performance of the simple light string, thereby reducing the production cost of the light string.

Further, the connection block is provided with a through hole, and the first lamp holder and the second lamp holder pass through the respective through hole through a lead of the respective light-emitting component and is fixed on the connection block. By forming the through hole, the first lamp holder and the second lamp holder can be quickly electrically connected to the wire through the lead, thereby improving the assembly convenience of the simple light string.

Further, a terminal electrically connected to the wire is arranged inside the base, and each of the light-emitting components of the first lamp holder and the second lamp holder is connected to the respective terminal through the respective lead. By arranging the terminal, it is convenient to connect the wire and lead quickly and stably to ensure the structural stability of the simple light string.

Further, the protective device is a current limiting resistor. The current-limiting resistor is connected in series in the circuit to limit the amplitude of the current in the branch to prevent the components connected in series from being burnt out due to an excessive current. Meanwhile, the current-limiting resistor can also act as a voltage divider. The protective device which is the current-limiting resistor improves the protective performance of the simple light string.

Further, support platforms are arranged on both sides of the base. By arranging the support platforms, it is convenient to fix the base stably, so that the connection block can be inserted into the base accurately and quickly, thereby improving the production efficiency of the simple light string.

The beneficial effects of the above simple light string are as follows. By arranging the first lamp holder and the second lamp holder, the stability of the simple light string can be ensured through the light-emitting components and the housings, the number of the protective device can be reduced while ensuring the protective performance of the simple light string, the production cost of the light string can be reduced, the safety of the simple light string can be improved, and the service life of the simple light string can be prolonged. By arranging the connection block and the base, the first lamp holder and the second lamp holder can be quickly and stably mounted on the wire to prevent the light-emitting components and the protective device from loosening during installation and use, thereby improving the production efficiency and the structural stability of the simple light string. By forming the positioning hole, the buckle can be quickly and stably fixed on the base, so that the assembly convenience and structural stability of the housing are improved. By forming the through hole, the first lamp holder and the second lamp holder can be quickly electrically connected to the wire through the lead, thereby improving the assembly convenience of the simple light string.

Additional aspects and advantages of the present disclosure will be set forth in part in the description which follows, and in part will be obvious from the description, or may be learned by practice of the present disclosure.

DETAILED DESCRIPTION

Figure 1:
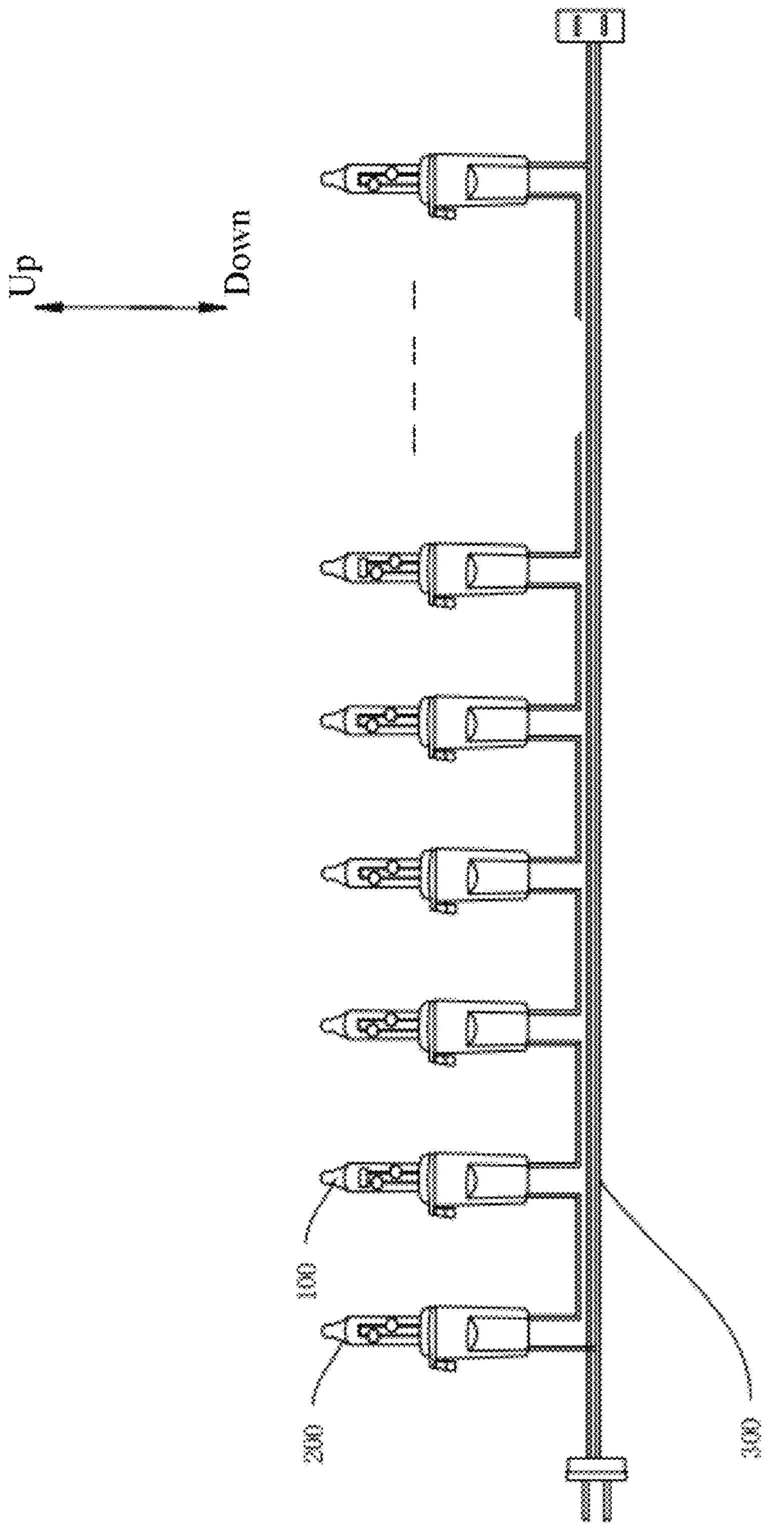
FIG. 1 is a schematic structural view of a simple light string according to an embodiment of the present disclosure.

The embodiments of the present disclosure will be described in detail below. Examples of the embodiments are shown in the accompanying drawings, where the same or similar reference numerals throughout represent the same or similar elements or elements with the same or similar functions. The embodiments described below with reference to the accompanying drawings are exemplary and are only used to explain the present disclosure and cannot be understood as limiting the present disclosure.

Figure 2:
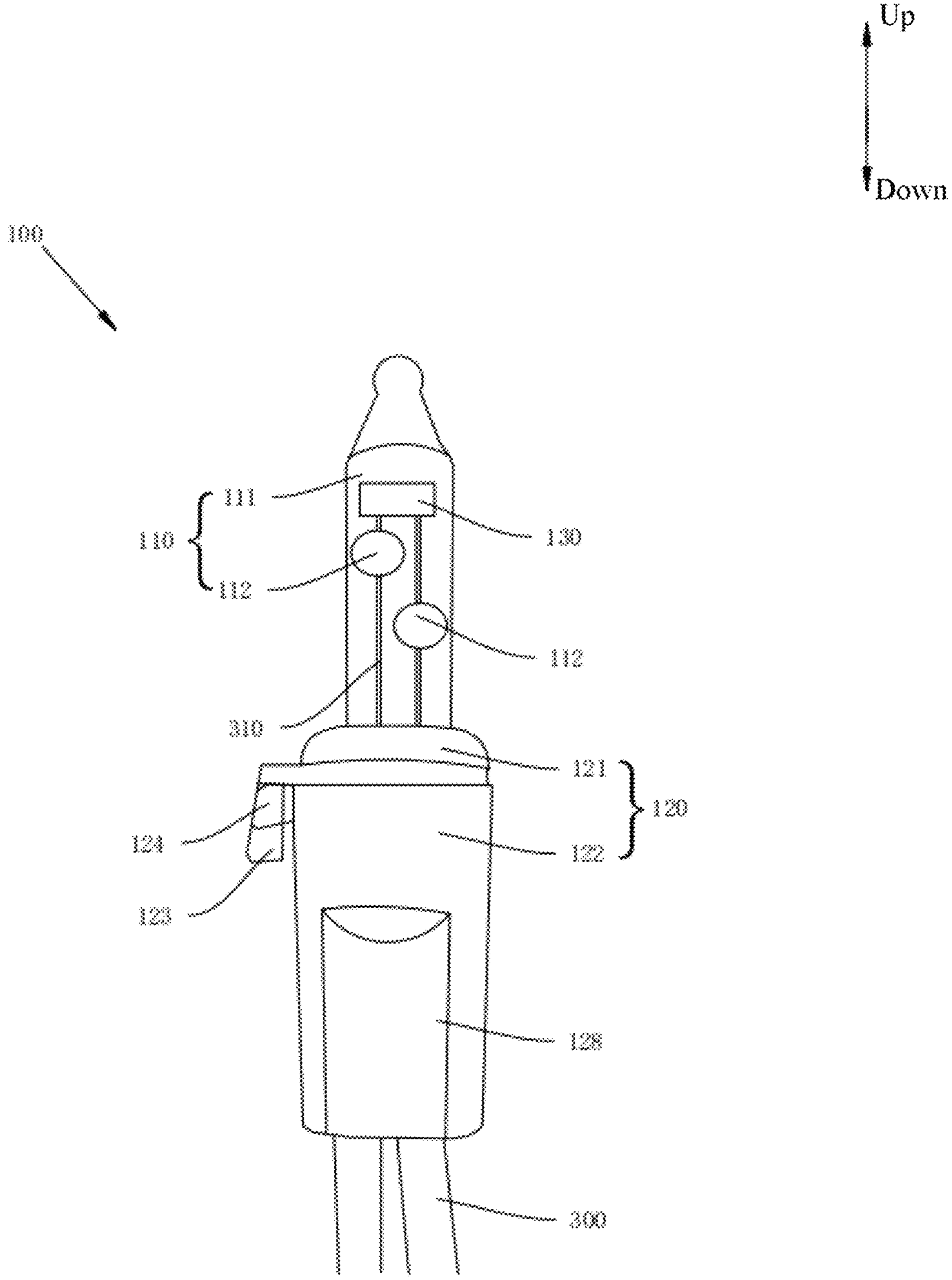
FIG. 2 is a schematic structural view of a first lamp holder in FIG. 1.
Figure 3:
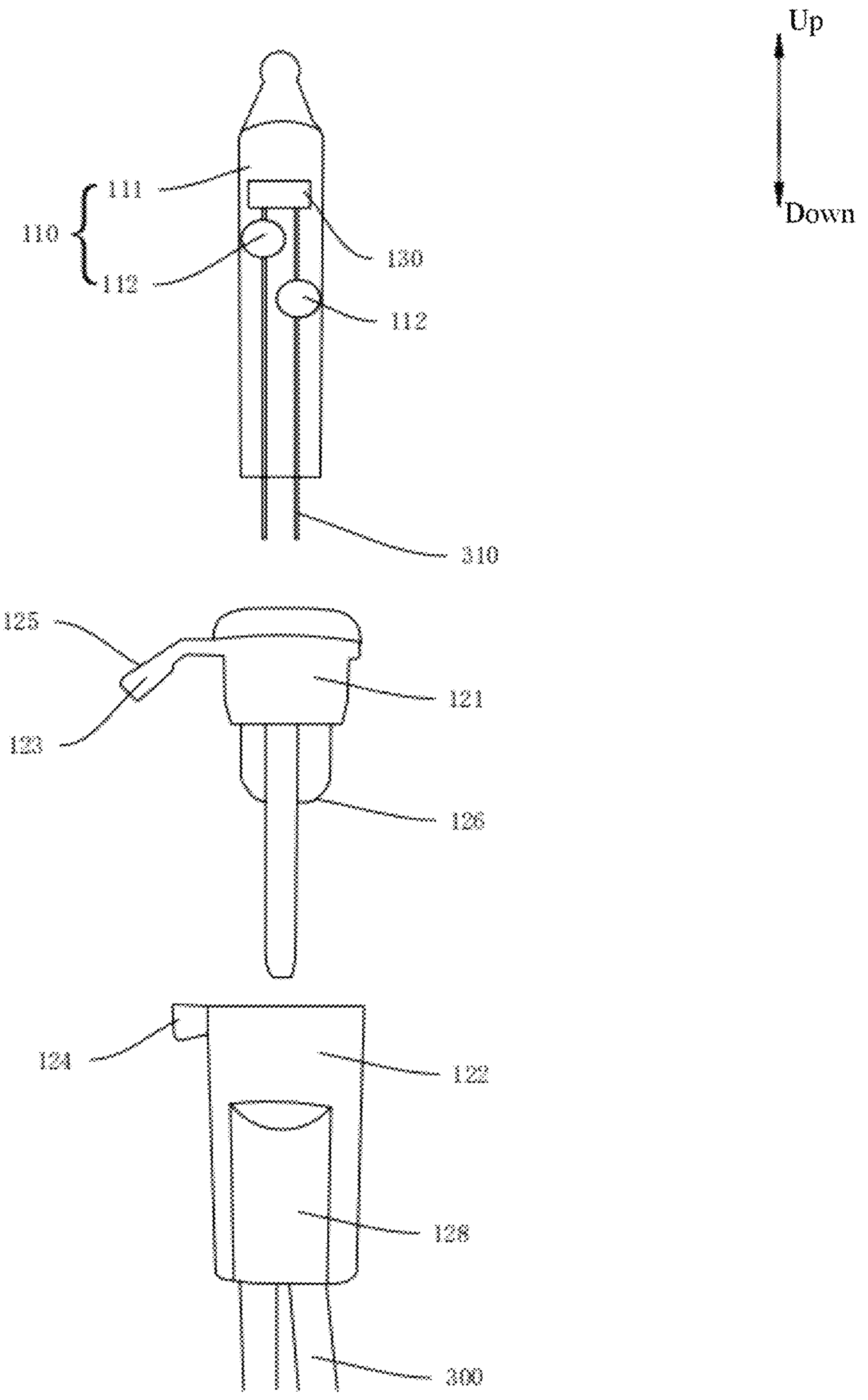
FIG. 3 is an exploded structural view of the first lamp holder in FIG. 1.
Figure 4:
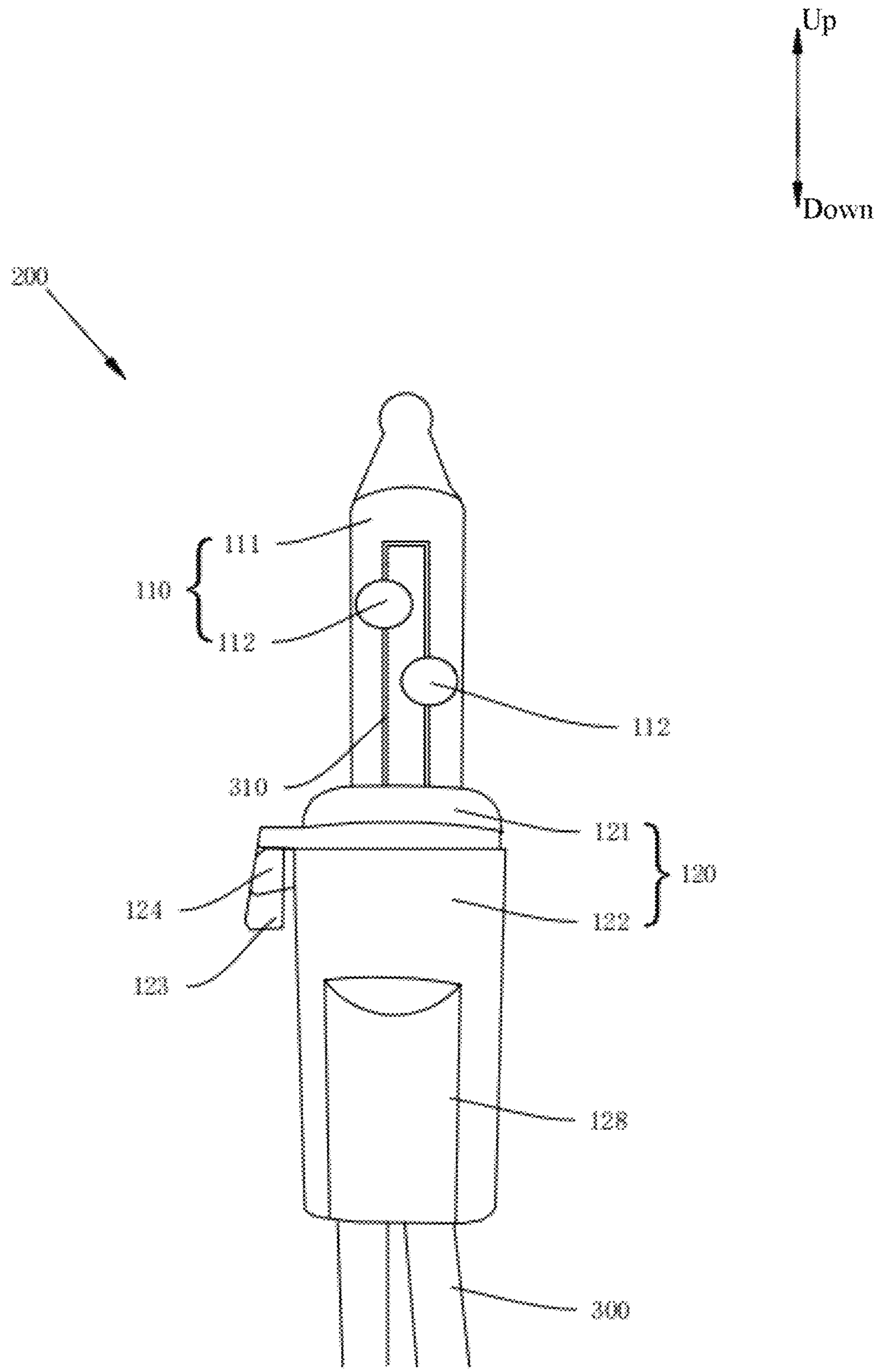
FIG. 4 is a schematic structural view of a second lamp holder in FIG. 1.
Figure 5:
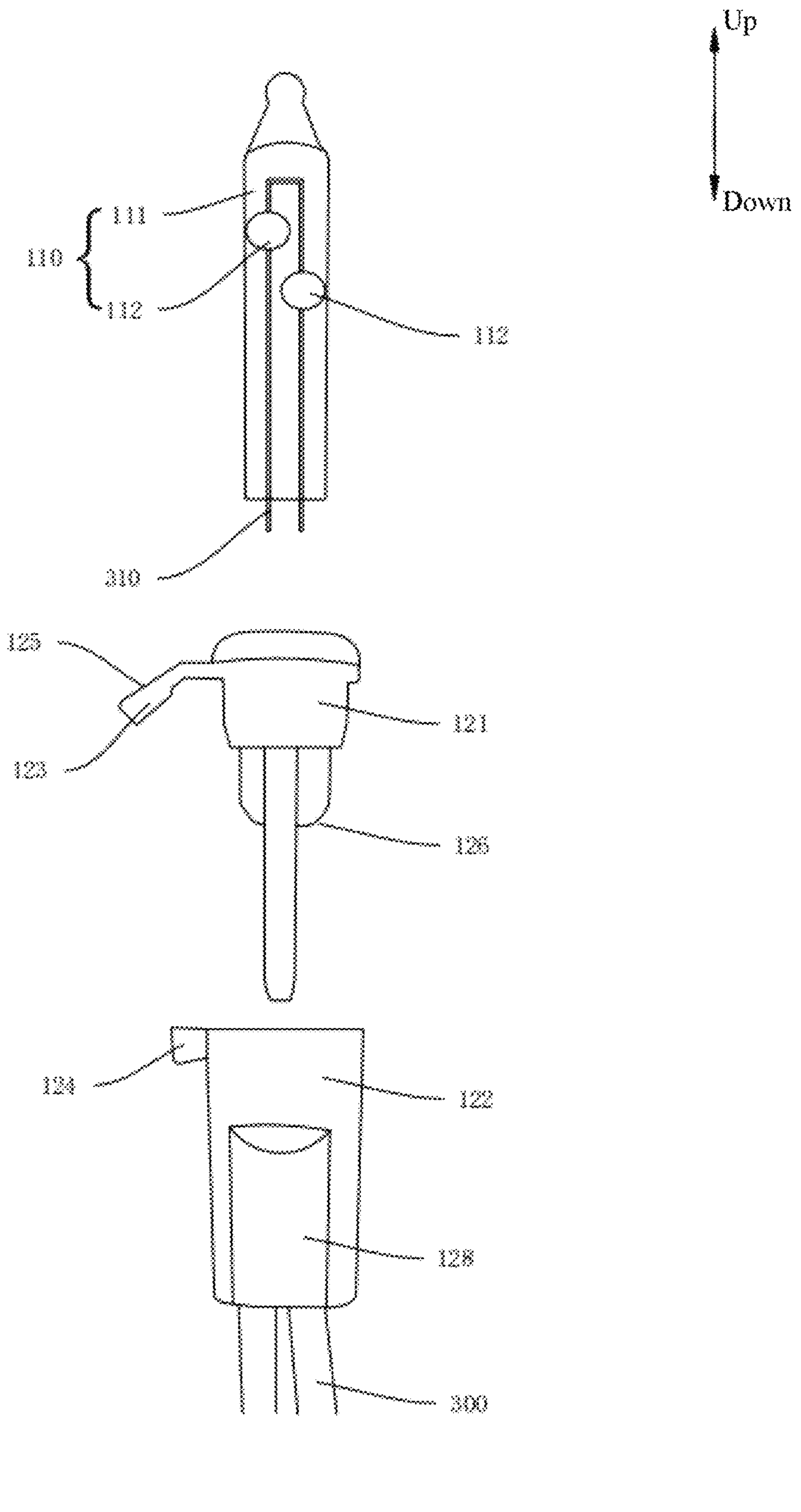
FIG. 5 is an exploded structural view of the second lamp holder in FIG. 1.

Referring to FIGS. 1 to 5, an embodiment of the present disclosure provides a simple light string, including: a first lamp holder 100, a second lamp holder 200, and a wire 300. The first lamp holder 100 and the second lamp holder 200 are connected in series on the wire 300. The first lamp holder 100 includes a light-emitting component 110, a housing 120, and a protective device 130. The second lamp holder 200 includes a light-emitting component 110 and a housing 120. The light-emitting components 110 are each provided with a lampshade 111 and a light-emitting device 112, and the light-emitting device 112 of the first lamp holder 100 is connected in series with the protective device 130. The housings 120 each include a connection block 121 and a base 122, and the light-emitting device 112 and the protective device 130 are fixed on the connection block 121 through the lampshade 111. The connection block 121 is movably provided with a buckle 123, and the base 122 is provided with a fixation block 124 that matches with the buckle 123. The base 122 is electrically connected to the wire 300.

By arranging the first lamp holder 100 and the second lamp holder 200, the stability of the simple light string can be ensured through the light-emitting components 110 and the housings 120, and the number of the protective device 130 can be reduced while ensuring the protective performance of the simple light string, the production cost of the simple light string can be reduced, the safety of the simple light string can be improved, and the service life of the simple light string can be prolonged. By arranging the connection block 121 and the base 122, the first lamp holder 100 and the second lamp holder 200 can be quickly and stably mounted on the wire 300, and the light-emitting components 110 and the protective device 130 can be prevented from loosening during installation and use, so that the production efficiency and structural stability of the simple light string are improved.

In another embodiment, the buckle 123 is provided with a positioning hole 125 that matches with the fixation block 124. By forming the positioning hole 125, the buckle 123 can be quickly and stably fixed on the base 122, thereby improving the assembly convenience and structural stability of the housing 120.

In another embodiment, the buckle 123 and the connection block 121 are integrally formed. This structure ensures the integrity of the buckle 123 and the connection block 121, prevents the buckle 123 from loosening during use, and improves the structural stability of the simple light string.

In another embodiment, a height of the fixation block 124 gradually decreases in a direction approaching the base 122. This structure ensures that the fixation block 124 can be quickly and stably fixed in the positioning hole 125, and also prevents the connecting stability of the connection block 121 and the base 122 from being affected as the buckle 123 falls off during use.

In another embodiment, the first lamp holder 100 is located between a plurality of second lamp holders 200. This structure reduces the number of the protective devices 130, reduces the production cost of the light string, improves the safety of the simple light string, and prolongs the service life of the simple light string.

In another embodiment, a ratio of a number of the second lamp holders 200 to a number of the first lamp holder 100 is greater than or equal to 3. This structure effectively reduces the number of the protective device 130 while ensuring the protective performance of the simple light string, thereby reducing the production cost of the light string.

In another embodiment, the connection block 121 is provided with a through hole 126, and the first lamp holder 100 and the second lamp holder 200 pass through the respective through hole 126 through a lead of the respective light-emitting component 110 and is fixed on the connection block 121. By forming the through hole 126, the first lamp holder 100 and the second lamp holder 200 can be quickly electrically connected to the wire 300 through the lead 310, thereby improving the assembly convenience of the simple light string.

In another embodiment, a terminal electrically connected to the wire 300 is arranged inside the base 122, and each of the light-emitting components 110 of the first lamp holder 100 and the second lamp holder 200 is connected to the respective terminal through the respective lead 310. By arranging the terminal, the wire 300 and the lead 310 can be connected quickly and stably to ensure the structural stability of the simple light string.

In another embodiment, the protective device 130 is a current limiting resistor. The current-limiting resistor is connected in series in the circuit to limit the amplitude of the current in the branch to prevent the components connected in series from being burnt out due to an excessive current. Meanwhile, the current-limiting resistor can also act as a voltage divider. The protective device 130 which is the current-limiting resistor improves the protective performance of the simple light string.

In another embodiment, support platforms 128 are arranged on both sides of the base 122. By arranging the support platforms 128, it is easy to fix the base 122 stably, so that the connection block 121 can be inserted into the base 122 accurately and quickly, improving the production efficiency of the simple light string.

The working principle of the present disclosure will be further described below.

In the production process of the simple light string according to the embodiments of the present disclosure, first, according to the specifications of the light-emitting device 112 and the protective device 130, the lampshade 111, the connection block 121, and the base 122 with corresponding sizes are selected. Then, the light-emitting device 112 and the protective device 130 are fixed in the lampshade 111 through the lead 310 to form the light-emitting components 110 of the first lamp holder 100 and the second lamp holder 200 respectively, where the first lamp holder 100 is provided with the light-emitting device 112 and the protective device 130, only the light-emitting device 112 is arranged in the second lamp holder 200. Next, the lead 310 is inserted into the through hole 126, so that the lampshade 111 is inserted into the connection block 121, and pressed upward through the lower end of the lead 310, the lampshade 111 is fixed on the upper end of the connection block 121. Two poles of the wire 300 are connected to the terminal inside the base 122. Finally, the lower end of the connection block 121 is inserted into the base 122, the lead 310 is quickly and stably connected to the terminal in the base 122. By pressing the buckle 123, the fixation block 124 can be stably inserted into the positioning hole 125, thereby improving the assembly convenience and structural stability of the housing 120, and further facilitating electrically connecting the first lamp holder 100 and the second lamp holder 200 to the wire 300 through the lead 310. In addition, the first lamp holder 100 and the second lamp holder 200 are inserted into the base 122 at an interval, so that the first lamp holder 100 is located between a plurality of second lamp holders 200, and it is guaranteed that the ratio of the number of the second lamp holders 200 to the number of the first lamp holders 100 is greater than or equal to 3 to reduce the usage amount of the first lamp holder 100 and the protective device 130 and save the production cost of the simple light string. In this way, the assembly process of the simple light string is completed. The whole process is efficient and orderly. The connection block 121 and the base 122 ensure the integrity and structural strength of the simple light string during the assembly process. The light-emitting device 112 and the protective device 130 can be electrically connected to the wire 300 through the lead 310 and the terminal quickly and stably, so that the production efficiency and yield rate of the simple light string are guaranteed.

During use, the light-emitting devices 112 of the first lamp holder 100 and the second lamp holder 200 are connected to the external power supply through the wire 300 and emit light to achieve the lighting effect. Meanwhile, the protective device 130 in the first lamp holder 100 that is spaced between the second lamp holders 200 plays a role in limiting voltage and current to prevent the light-emitting device 112 in the event of failure from causing damage to other light-emitting devices 112 and wires 300, thereby ensuring the protective performance and service life of the simple light string.

As can be seen from the above description, according to the simple lamp string of the present disclosure, by arranging the first lamp holder 100 and the second lamp holder 200, the stability of the simple lamp string can be guaranteed through the light-emitting components 110 and the housings 120, the number of the protective device 130 can be reduced while ensuring the protective performance of the simple light string, the production cost of the light string can be reduced, the safety of the simple light string can be improved, and the service life of the simple light string can be prolonged. By arranging the connection block 121 and the base 122, the first lamp holder 100 and the second lamp holder 200 can be quickly and stably mounted on the wire 300 to prevent the light-emitting components 110 and protective device 130 from loosening during installation and use, thereby improving the production efficiency and the structural stability of the simple light string. By forming the positioning hole 125, the buckle 123 can be quickly and stably fixed on the base 122, so that the assembly convenience and structural stability of the housing 120 are improved. By forming the through hole 126, the first lamp holder 100 and the second lamp holder 200 can be quickly electrically connected to the wire 300 through the lead 310, thereby improving the assembly convenience of the simple light string.

The embodiments of the present disclosure have been described in detail above with reference to the accompanying drawings. However, the present disclosure is not limited to the above embodiments. Various modifications can be made within the scope of knowledge of those of ordinary skill in the art without departing from the gist of the present disclosure.

What is claimed is:

1. A simple light string, comprising: a plurality of first lamp holders, a plurality of second lamp holders, and a wire, wherein the plurality of first lamp holders and the plurality of second lamp holders are connected in series on the wire, wherein the plurality of first lamp holders are located between the plurality of second lamp holders; each of the plurality of first lamp holders comprises a light-emitting component, a housing, and a protective device; each of the plurality of second lamp holders comprises a light-emitting component and a housing, wherein each of the plurality of second lamp holders does not include the protective device; each of the light-emitting components of the plurality of first lamp holders and the plurality of second lamp holders is provided with a lampshade and a light-emitting device, and each of the light-emitting devices of the plurality of first lamp holders is connected in series with the protective device; each of the housings of the plurality of first lamp holders and the plurality of second lamp holders comprises a connection block and a base, and the light-emitting device and the protective device are fixed on the connection block through the lampshade; the connection block is movably provided with a buckle, and the base is provided with a fixation block that matches with the buckle; and the base is electrically connected to the wire; wherein a ratio of a number of the plurality of second lamp holders to a number of the plurality of first lamp holders is greater than or equal to 3.

2. The simple light string according to claim 1, wherein the buckle is provided with a positioning hole that matches with the fixation block.

3. The simple light string according to claim 2, wherein the buckle and the connection block are integrally formed.

4. The simple light string according to claim 2, wherein a height of the fixation block gradually decreases in a direction approaching the base.

5. The simple light string according to claim 1, wherein the connection block is provided with a through hole, and each of the light-emitting components of the plurality of first lamp holders and the plurality of second lamp holders passes through the respective through hole through a lead of the respective light-emitting component and is fixed on the connection block.

6. The simple light string according to claim 1, wherein the protective device is a current limiting resistor.

7. The simple light string according to claim 1, wherein support platforms are arranged on both sides of the base.

* * * * *